United States Patent [19]
Mattes

[11] Patent Number: 6,143,998
[45] Date of Patent: Nov. 7, 2000

[54] ELECTRICAL SWITCH, AND METHOD OF MANUFACTURING SUCH A SWITCH

[75] Inventor: Anton Mattes, Balgheim, Germany

[73] Assignee: Marquardt GmbH, Rietheim-Weilheim, Germany

[21] Appl. No.: 09/230,586
[22] PCT Filed: Jul. 23, 1997
[86] PCT No.: PCT/DE97/01587
  § 371 Date: Jan. 29, 1999
  § 102(e) Date: Jan. 29, 1999
[87] PCT Pub. No.: WO98/05051
  PCT Pub. Date: Feb. 5, 1998

[30] Foreign Application Priority Data

Jul. 29, 1996 [DE] Germany ............................ 196 30 533

[51] Int. Cl.[7] ................................ H01H 1/02; H01H 1/06
[52] U.S. Cl. ............................ 200/275; 29/879; 200/239
[58] Field of Search ...................... 29/622, 874, 876–879, 29/882; 200/238, 239, 262, 275, 264–270, 278, 284

[56] References Cited

U.S. PATENT DOCUMENTS

| | | | |
|---|---|---|---|
| 4,364,173 | 12/1982 | Broadhurst | 29/882 |
| 4,488,356 | 12/1984 | Gust et al. | 29/882 |
| 5,020,217 | 6/1991 | Gonzalez et al. | 29/882 |
| 5,076,426 | 12/1991 | Thomas | 206/330 |
| 5,140,114 | 8/1992 | Sunaga et al. | 200/262 |
| 5,497,133 | 3/1996 | Dawson et al. | 335/83 |
| 5,639,271 | 6/1997 | Balme | 439/862 |

FOREIGN PATENT DOCUMENTS

| | | | |
|---|---|---|---|
| 0 678 882 | 10/1995 | European Pat. Off. | H01H 11/04 |
| 30 05 662 | 2/1980 | Germany | H01H 11/04 |
| 195 12 277 | 10/1995 | Germany | H01H 1/02 |

Primary Examiner—Michael Friedhofer
Attorney, Agent, or Firm—Venable; Robert Kinberg; Catherine M. Voorhees

[57] ABSTRACT

An electric switch having a contact system includes a contact with a contact body (7) and a contact surface (10). The contact is arranged in a recess (25) on a contact carrier (8) in such a way that the contact surface is exposed on the contact carrier (8) and the contact body (7) projects at least on one side (23) of the contact carrier (8). The contact is fastened on the contact carrier (8) by a region (27, 27') of the contact body that is adjacent an edge (28) of the recess (25). The region (27, 27') of the contact body is embossed with the side (23) of the contact carrier. In addition, for the purpose of fastening, at least one spot weld (30, 30') produced by means of a laser beam (39, 39') is arranged at least partially on the embossed region (27, 27') of the contact body (7) in such a way that the weld zone of the spot weld (30, 30') includes at least partially a region bordering the contact carrier (8), the embossed region (27, 27') and, if appropriate, a part (46) of the contact body (7), which is located in the recess (25), in a neighborhood of the edge (28) of the recess (25). Furthermore, a method is specified for producing such a contact system.

18 Claims, 10 Drawing Sheets

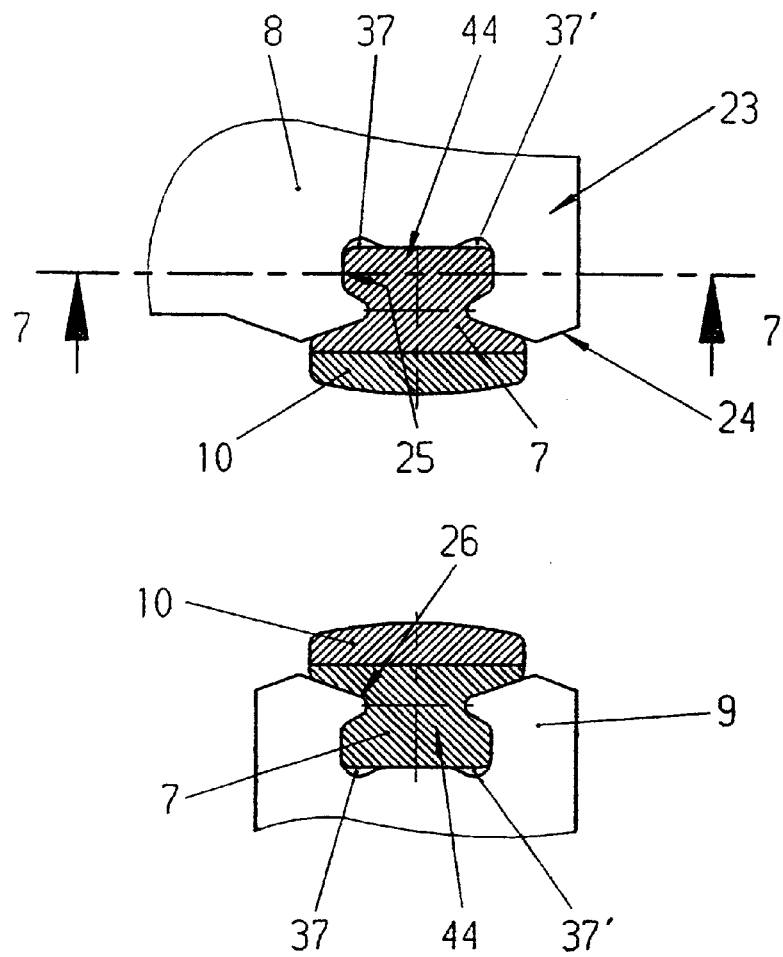
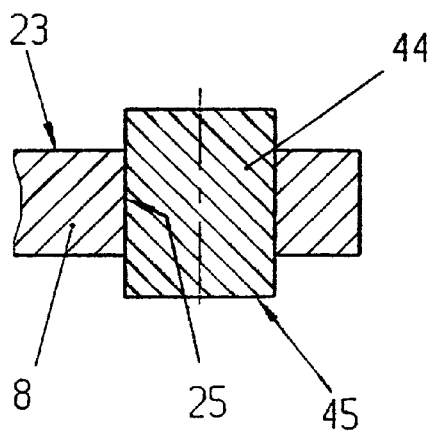
Fig. 6
Fig. 7

ELECTRICAL SWITCH, AND METHOD OF MANUFACTURING SUCH A SWITCH

BACKGROUND OF THE INVENTION

The invention relates to an electric switch, and to a method for producing a contact system for such an electric switch.

Known switches are frequently equipped with a small housing, and so only a small installation space is available in the housing for the contact system. Nevertheless, the contact system designed for this small installation space is intended to ensure a reliable switching performance.

DE-A 195 12 277 has disclosed such an electric switch having a contact system, the contact system having a contact arranged on a contact carrier. The contact, comprising in turn a contact body and a contact surface, is arranged in a recess on the contact carrier in such a way that the contact surface is exposed on a first side of the contact carrier. The contact body projects at a further, second side of the contact carrier, the second side being approximately perpendicular to the first side, and is fastened on the contact carrier by embossing, calking, welding or the like.

This contact system is installed in the housing of the switch together with further components in subsequent fabrication steps. The fabrication steps are frequently performed in appropriately designed automatic machines. It has been found that in some circumstances the contact can become detached from the contact carrier in the course of the further fabrication steps, with the result that the functional reliability of the switch is endangered.

SUMMARY OF THE INVENTION

It is an object of the invention to further improve the fastening of the contact on the contact carrier in the known contact system, and to specify a suitable method for producing such an improved contact system, the aim being, in particular, for the method of production to be suitable for use in an automatic machine.

This object is achieved by an electric switch with a contact system arranged in a recess where a region adjacent to an edge of the recess of a projecting contact body is embossed with a first side of the contact carrier, and at least one spot weld is arranged at least partially on the embossed region of the contact body and is produced by means of a laser beam in such a way that the resultant weld zone of the spot weld includes at least partially a region bordering the contact carrier and the embossed region.

The above object is further achieved in a method for producing a contact system for an electric switch by the steps of embossing a region adjacent an edge of a recess of a projecting contact body with a first side of the contact carrier and focussing a laser beam at least partially on the embossed region of the contact body in such a way to produce a weld zone of a resultant spot weld that includes at least partially a region bordering the contact carrier and the embossed region.

Further refinements of the invention are the subject matter of the subclaims.

It is advantageous when the embossed region of the contact body forms an essentially planar surface which runs parallel with reference to the surface of the second side of the contact carrier. As a result, it is possible to keep for the scattering losses of the laser radiation which do not contribute to the welding to be low. If the planar surface of the embossed region covers the joint zone included in the weld zone of the spot weld, the entire intensity of the laser beam falls on the embossed region, as a result of which the uncontrollable, fluctuating scattering losses of the contact carrier are completely eliminated. This planar surface is produced by planishing the region of the contact body during embossing by means of an appropriately configured tool. In particular, the planar surface can be constructed to run evenly with the second side of the contact carrier, with the result that the direction of the laser beam for the welding can be adjusted in a simple way with reference to the surface of the second side of the contact carrier. In addition, planishing ensures the contact body is clamped in the recess on the contact carrier, thus ruling out distortion during welding.

In one embodiment, a bead can be embossed on the second side in the contact carrier, the bead running at least along a subregion of the contact body. This measure also contributes to increasing the bearing pressure on the contact body, and thus the clamping of the contact body in the recess on the contact carrier, thereby effectively preventing the contact body from changing position until being welded. Moreover, the region of the contact body to be embossed can then be embossed into the bead, as a result of which the embossed material which originates from the contact body is received by the bead. It is possible by appropriate dimensioning of the bead to ensure that the entire embossed material of the contact body is located in the bead, and that the embossed material can then be planished approximately level with the surface of the second side of the contact carrier. If appropriate, the region to be embossed can further be peeled back on the projecting contact body before the embossing, in order to facilitate the embossing. If the laser beam is focused as a whole on the embossed region, the weld zone of the spot weld includes the embossed region in the bead, thereby achieving a particularly reliable fastening of the contact body on the contact carrier.

It may be recommended, if appropriate, for the contact body to be embossed and to be welded at a plurality of locations with the contact carrier, in order to improve the fastening of the contact body on the contact carrier still further. For improved fastening, it is sufficient to emboss and to weld the contact body with the second side of the contact carrier at two regions which are preferably situated approximately opposite one another. A preferred location of the respective region to be embossed, is on that part of the contact body which adjoins the exposed contact surface. In order to keep fabrication times as short as possible, the embossing can be undertaken simultaneously in one fabrication step at the two regions by appropriately configuring the embossing tool. It is likewise possible for the welding to be performed simultaneously at the two regions by, for example, splitting the laser beam into two component beams and focusing the component beams on one of the regions in each case. Furthermore, it can be advantageous to arrange on the side opposite the free contact surface between the contact body and the contact carrier at least one free space in the recess for the purpose of receiving displaced material of the contact body, thus preventing the introduction of stresses into the contact carrier during embossing.

In order for the backscattering losses, which reduce the energy available for the actual welding, to be kept as low as possible, it is advantageous if the laser beam for the spot weld is directed essentially approximately perpendicularly onto the surface of the embossed region. If the embossed region is approximately level with the surface of the contact carrier, the laser beam can then be aligned in a simple way approximately perpendicular to the second side of the contact carrier. In general, the spot weld will be produced by a pulsed laser beam, the pulse duration being tuned to the energy required for producing the spot weld and, if appropriate, to the cycle time for the fabrication steps.

The advantages achieved with the invention include, among others that reliable fastening of the contact body on the contact carrier is achieved. This eliminates the risk of the contact body becoming detached from the contact carrier during the subsequent fabrication steps, which would result in a non-functional contact system. Finally, waste is thereby reduced in the production of the switch. Furthermore, the accuracy in placing the contact bodies on the contact carrier is enhanced, resulting in a substantial improvement in quality. In addition, the production of the contact system can be completely automated with the aid of the method of production according to the invention. A substantial cost advantage is thereby achieved.

BRIEF DESCRIPTION OF THE DRAWINGS

Exemplary embodiments and developments of the invention are represented in the drawings and described in more detail below. In the drawings:

FIG. 6 shows an enlarged segment corresponding to the region VI from FIG. 3 after the introduction of the contact bodies into the respective recesses;

FIG. 7 shows a section along the line 7—7 from FIG. 6;

DETAILED DESCRIPTION OF THE INVENTION

Figure 1:
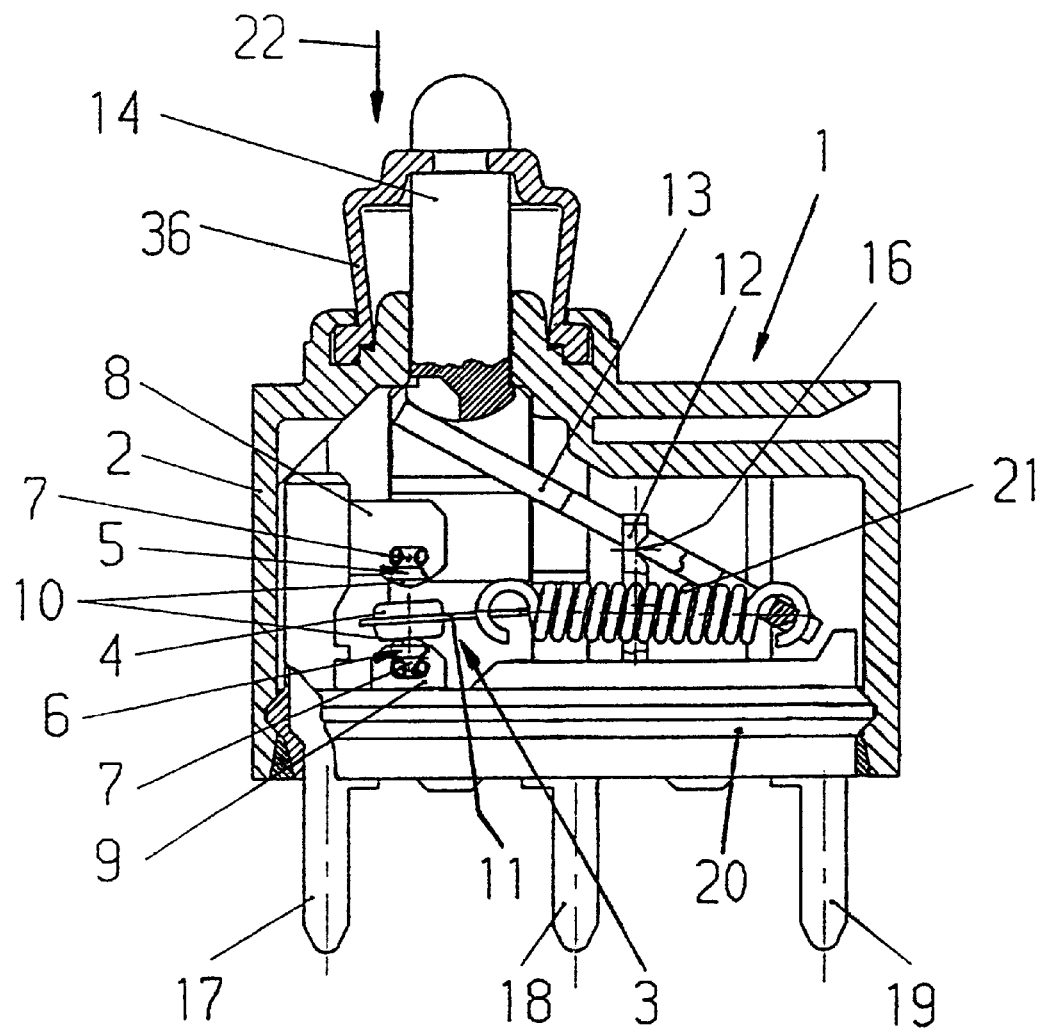
FIG. 1 shows a longitudinal section through an electric switch.

An electric switch 1 designed as a quick-make-quick-break switch is to be seen in more detail in FIG. 1. The switch 1 has a housing 2 with a contact system 3 arranged therein. The contact system 3 presently comprises two fixed contacts 5, 6 and a switching contact 4 located between the two fixed contacts 5, 6. The fixed contacts 5, 6 in turn comprise a contact body 7 and a contact surface 10, and are fastened with their contact body 7 to a respective contact carrier 8, 9 in such a way that the contact surfaces 10 of the fixed contacts 5, 6 are situated opposite one another. The switching contact 4 is arranged on a contact tongue 11 which is, in turn, mounted movably on a web 12 in a first receptacle 15, which is visible in FIG. 2. The contact carriers 8, 9 and the web 12 are fastened on a base 20 of the housing 2. Also located on the base 20 are three electric terminals 17, 18, 19, projecting from the housing 2, for feeding the electric voltage, electric connection existing between the terminal 17 and the contact carrier 8, the terminal 18 and the contact carrier 9 and the terminal 19 and the web 12. The web 12 has a further, second receptacle 16, on which a two-armed internal lever 13 is rotatably mounted. The first lever arm of the internal lever 13 is operationally connected to an actuating member 14 which reaches at the top side into the interior of the housing 2 and is provided with a bellows 36 for sealing purposes. One end of a tension spring 21 is fastened on the second lever arm of the internal lever 13. The other end of the tension spring 21 is hung in the contact tongue 11. The actuating member 14 acts on the actuatable contact system 3 in such a way that the switching contact 4 switches over between the two fixed contacts 5, 6 and in the process comes to bear against the contact surface 10 of the respective fixed contact 5, 6.

If the actuating member 14 is located in the unpressed position shown in FIG. 1, the switching contact 4 bears against the contact surface 10 of the fixed contact 6, the terminals 18 and 19 being connected in an electrically conducting fashion. If the actuating member 14 is pressed in the direction of the arrow 22, the internal lever 13 is moved anticlockwise about the fulcrum in the second receptacle 16, the internal lever 13 acting, in turn, on the tension spring 21. The contact tongue 11 consequently snaps over at a specific position of the actuating member 14, with the result that the switching contact 4 bears against the contact surface 10 of the fixed contact 5, the terminals 17 and 19 thereby being connected in an electrically conducting fashion.

Figure 2:
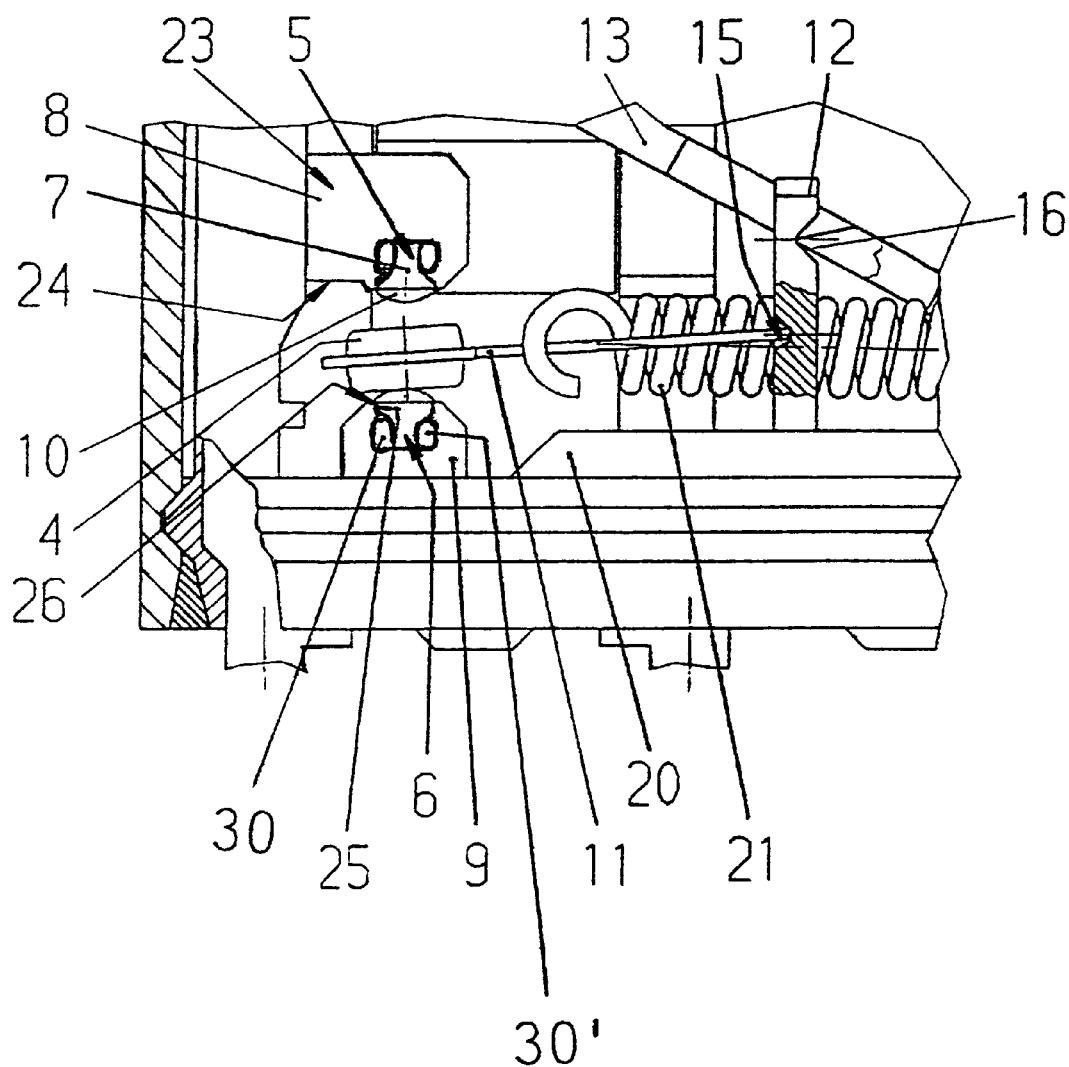
FIG. 2 shows an enlarged segment of the contact system from FIG. 1.

As is to be gathered, in particular, from FIG. 2, the contact carriers 8, 9 are designed in the manner of a conductor track with a first narrow side 24 and a further, second broad side 23 which is preferably approximately perpendicular to the first side 24. In this arrangement, the first side 24 of the contact carrier 8, 9 faces the switching contact 4. Arranged on the second side 23 is a recess 25 with an opening 26 which faces the switching contact 4 and is located on the first side 24. The contact body 7 of the fixed contact 5, 6 is designed with a cross section which largely corresponds to the recess 25, as seen from FIG. 5, in an enlarged view of the contact wire 35 and is inserted into the recess 25 in such a way that the contact surface 10, cooperating with the switching contact 4, of the fixed contact 5, 6 is exposed in the opening 26 on the first side 24 of the contact carrier 8, 9. The contact surface 10, cooperating with the switching contact 4, of the fixed contact 5, 6 preferably projects over the first side 24 of the contact carrier 8, 9 in the direction of the switching contact 4. However, in an embodiment of the invention, the contact surface 10 may be approximately level with the first side 24 of the contact carrier 8, 9.

The following description the fastening of the fixed contacts 5, 6 on the contact carrier 8, 9 in more detail, with only the fixed contact 5 being shown in individual figures referred to for this purpose. Of course, the statements also hold likewise for the fixed contact 6.

Figure 16:
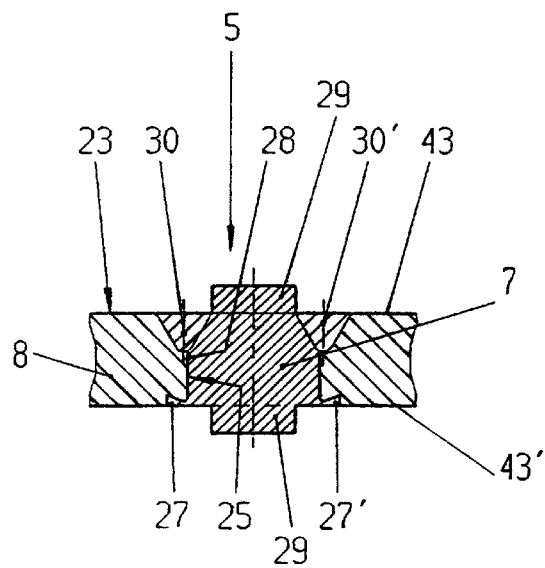
FIG. 16 shows a section as in FIG. 15 after welding.
Figure 8:
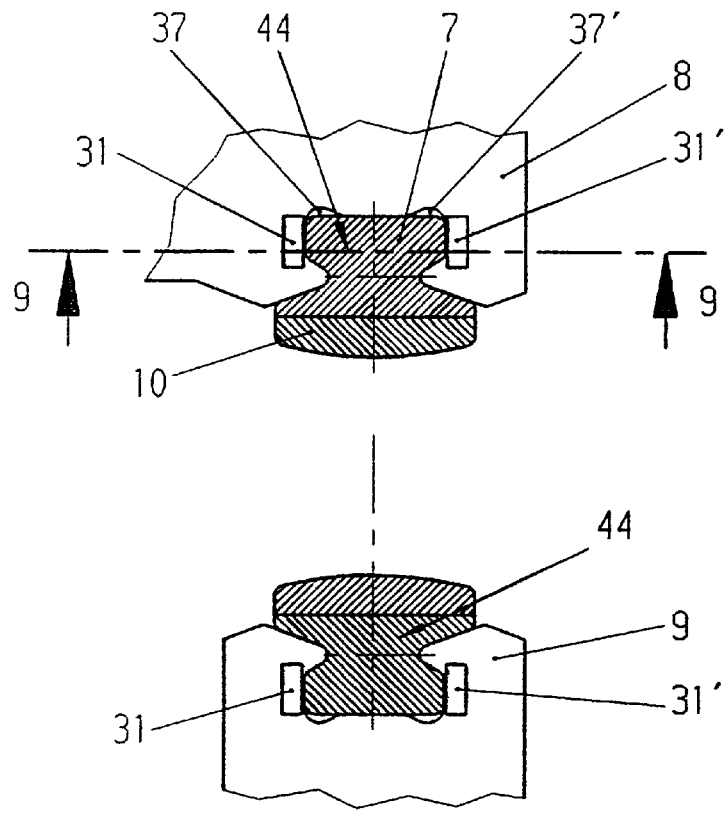
FIG. 8 shows another embodiment of the invention, in particular, a segment as in FIG. 6 after the embossing of a bead into the contact carrier.
Figure 9:
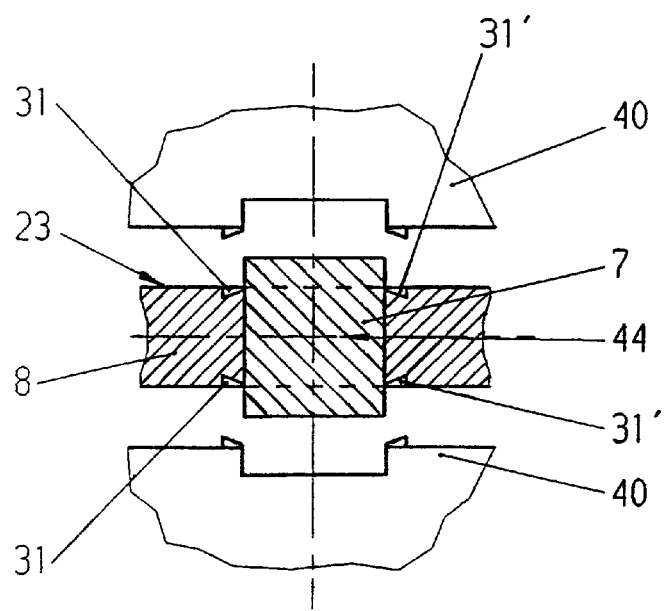
FIG. 9 shows a section along the line 9—9 from FIG. 8.

As follows further from FIG. 16, in which a cross section through the fixed contact 5 fastened on the contact carrier 8 is shown, the contact body 7 projects slightly on the second side 23 of the contact carrier 8 with reference to the surface 43, 43' of said second side, and is fastened on the contact carrier 8 by embossing and welding. The embossing is carried out in such a way that, as also emerges in more detail from FIG. 15, only a region 27, assigned to the edge 28 of the recess 25, of the projecting contact body 7 is embossed with the second side 23 of the contact carrier 8. The remainder 29 of the contact body 7 continues to project. Thus, the embossed material of the contact body 7 overlaps the contact carrier 8 in the region of the edge 28 at the recess 25. In addition, further welding is done in the form of spot welding between the contact body 7 and the contact carrier 8. For this purpose at least one spot weld 30 produced by means of a laser beam 39 is arranged at least partially on the embossed region 27 of the contact body 7 in such a way that the weld zone of the spot weld 30 includes at least partially the border region between the contact carrier 8 and the embossed region 27. If desired, the intensity of the laser beam 39 can be selected such that the weld zone penetrates even more deeply into the contact carrier 8 and additionally includes a part 46, shown in FIG. 15, of the contact body 7, which is located inside the recess 25, in a neighborhood of the edge 28 of the recess 25. It can suffice for an embossed region 27 and a spot weld 30 to be arranged on the fixed contact 5, 6. The fastening of the contact body 7 on the contact carrier 8, 9 can further be improved when a plurality of spot welds 30, 30' are arranged per fixed contact 5, 6. It has proved to be particularly suitable for the contact body 7 to be embossed and welded with the second side 23 of the contact carrier 8, 9 on two mutually opposite regions 27, 27'. As is to be seen, for example, in FIG. 14, the respective embossed region 27, 27' is expediently located on that part of the contact body 7 which adjoins the exposed contact surface 10. As emerges from FIG. 16, it goes without saying that it is also possible if desired to provide embossing on the further surface 43' of the second side 23. If appropriate, welding of the contact body 7 to the contact carrier 8 can additionally be undertaken on the surface 43', in order to achieve an even further improved fastening. If there is no embossing on the further surface 43' of the second side 23, the contact body 7 also need not project there, but can then, rather, be level with the surface 43' in the recess 25, for example.

As is shown in FIG. 6, a contact piece 44 includes a contact body 7 and a contact surface 10. In a preferred embodiment, it is possible for there also to be a free space 37 between the contact body 7 and the contact carrier 8, 9 on the side opposite the free contact surface 10 or, if appropriate, there can also be a plurality of free spaces 37, 37' in the recess 25. The free spaces 37, 37' are used to receive excess, displaced material of the contact body 7 during embossing. This prevents the recess 25 from being bent up and widened during embossing of the contact body 7, thus eliminating the risk of the contact body 7 falling out of the recess 25 until welding.

Figure 3:
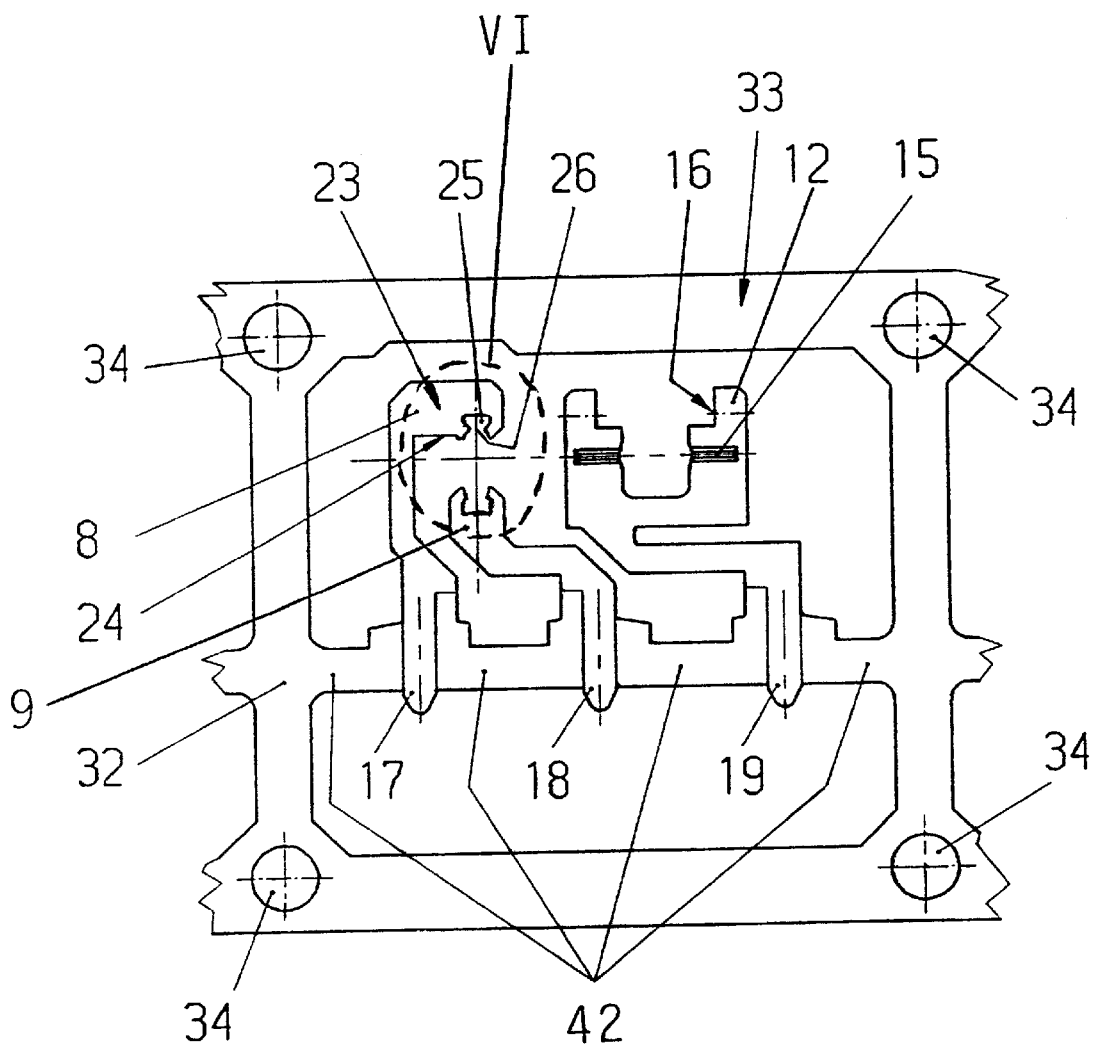
FIG. 3 shows the contact carrier in the form of a blanking skeleton.
Figure 4:
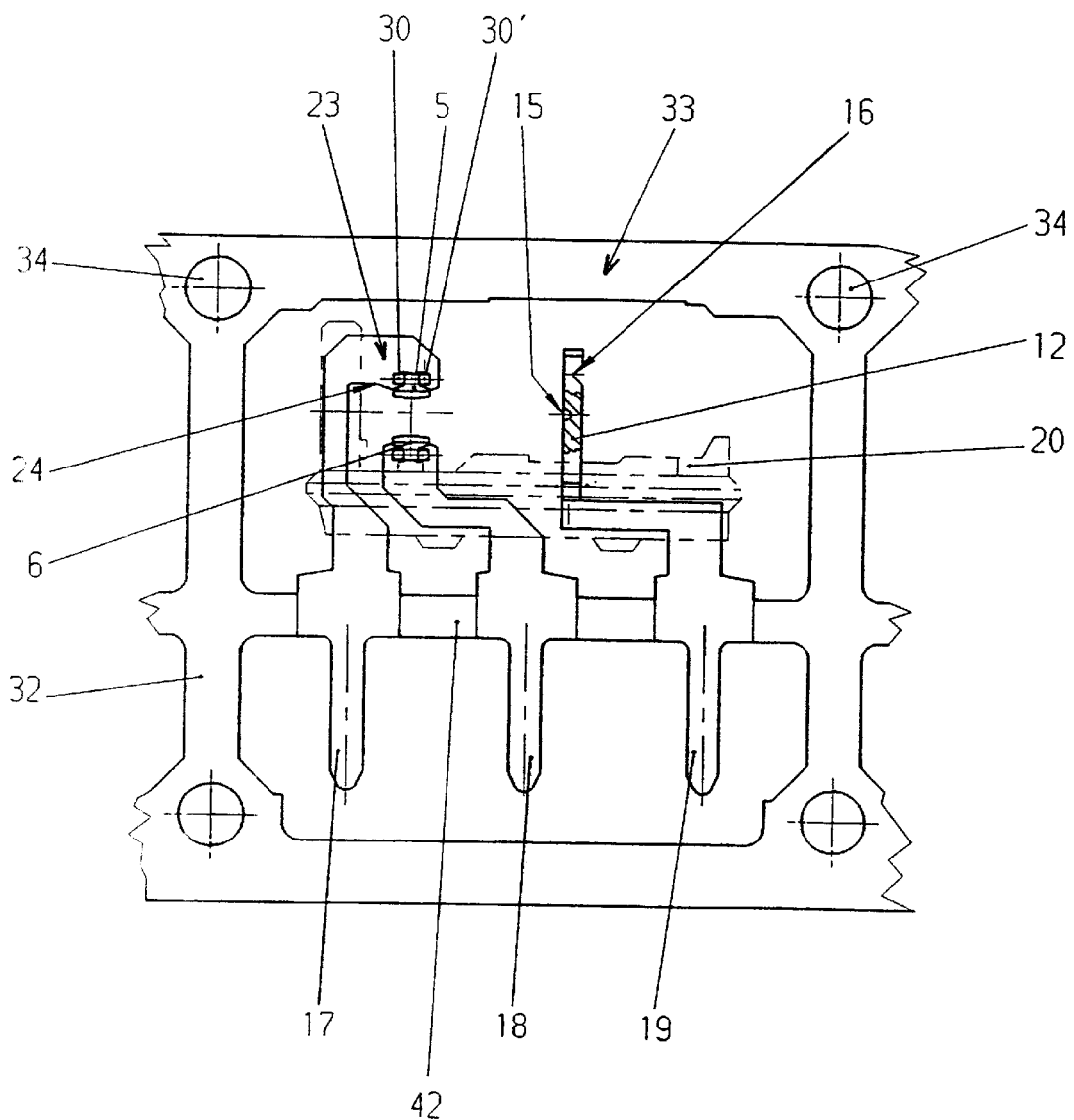
FIG. 4 shows the blanking skeleton after the attachment of the contacts.
Figure 5:
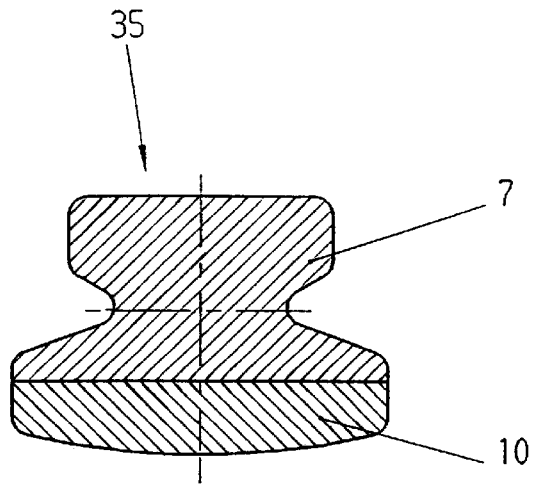
FIG. 5 shows the cross section through the profile of a wire made from contact material.

In order to produce the switch 1 and, in particular, the contact system 3, it can be recommended to design the contact carriers 8, 9 and the web 12 in the desired form by using a blanking skeleton 32, as is shown in FIG. 3. The blanking skeleton 32, including the recesses 25 in the contact carriers 8, 9, is blanked in a plurality of work steps, if appropriate, from a strip 33, for example a copper strip, which may already be electroplated in specific regions. In this case, the blanking skeletons 32 initially remain arranged sequentially in the strip 33. During the blanking operation, the strip 33 is further provided with reference holes 34 for the further processing steps and transportation. As shown in FIG. 4, fixed contacts 5, 6 are introduced into this blanking skeleton 32 by means of a wire 35 which is shown in FIG. 5 and is profiled to correspond with the recess 25. The wire 35 is designed as a bimetal wire, a first material being used as contact body 7 and a second material as contact surface 10. For example, the first material for the contact body 7 can be a copper-nickel-iron alloy, and the second material for the contact surface 10 can be a silver-nickel alloy.

The individual method steps for producing the fixed contacts 5, 6 are explained in more detail below with reference to FIGS. 6 to 15.

The strip 33, processed in this way, with the blanking skeletons 32 in accordance with FIG. 3, and the prefabricated wire 35 made from the contact material in accordance with FIG. 5 are fed to a device which is not shown in more detail and is known per se. Contact pieces 44 made from the wire 35 are cut to the desired length in this device. As is to be seen with reference to FIGS. 6 and 7, the contact pieces 44 are subsequently arranged on the contact carrier 8, 9 in the blanking skeleton 32 by inserting the contact piece 44 into the recess 25 from the second side 23, and thus approximately with its front surface 45 vertical to the second side 23, in such a way that the contact surface 10 of the contact piece 44 is exposed on the first side 24 of the contact carrier 8, 9 in the opening 26. As is to be seen in FIG. 7, the length of the contact piece 44 is dimensioned such that the contact body 7 projects on the further, second side 23 of the contact carrier 8, 9, which second side is preferably approximately perpendicular to the first side 24.

The contact piece 44 is subsequently fastened on the contact carrier 8, 9. As is to be seen in FIGS. 12 and 13, an embossing tool 38 is firstly used to emboss the contact body 7 on the contact carrier 8, 9. The embossing tool 38 is configured in such a way that only a region 27 of the projecting contact body 7 which is assigned to the edge 28 of the recess 25 is embossed to be flat with the second side 23 of the contact carrier 8, 9. The remainder 29 of the contact body 7 thus remains projecting. In accordance with FIGS. 14 and 15, thereafter at least one spot weld 30 is introduced for the purpose of further fastening by means of a laser beam 39 in the direction of the second side 23 of the contact carrier 8, 9, this expediently being a pulsed laser beam. The laser beam 39 is focused in this case at least partially on the embossed region 27 of the contact body 7 in such a way that the weld zone of the spot weld 30 includes at least partially the border region between the contact carrier 8, 9 and the embossed region 27. If appropriate, the intensity of the laser beam 39 can be increased in such a way that the weld zone penetrates even more deeply into the contact carrier 8, 9 and, as already mentioned, additionally includes a part of the contact body 7, which is located in the recess 25, in a neighborhood of the edge 28 of the recess 25. This is indicated in FIG. 15 by the part 46 of the weld zone. Because of the thermal conduction, on the embossed region 27 the spot weld has a somewhat larger diameter than the laser focus.

After the fixed contacts 5, 6 have been introduced and fastened in the blanking skeleton 32, the web 12 is bent over by approximately 90 degrees perpendicular to the planar of the contact carriers 8, 9 and is injection-coated with the base 20 in an injection molding machine, with the result that the blanking skeletons 32 finally appear as shown in FIG. 4. Subsequently, the bases 20 can be separated with the blanking skeleton 32 in the strip 33, the connections 42, which are then no longer required and serve only for mechanical cohesion are severed at the terminals 17, 18, 19 in the blanking skeleton 32. The remaining assembly of the switch 1 can then finally be performed.

The method of production described ensures a uniform, reproducible quality for the fastening of the fixed contacts 5, 6 on the contact carrier 8, 9, since, because of the embossing, the laser beam 39 is essentially always focused on the same basic material, specifically on the material of the contact body 7. In addition, the basic material has not yet aged, since the welding is undertaken subsequent to the embossing. Thus, the position at which the laser beam 39 impinges on the basic material has constant optical properties, with the result that the same optical conditions prevail for each spot weld 30 in the individual sequential blanking skeletons 32, in particular the reflective ability of the embossed region 27 is invariable. Since the laser power is held constant, it follows that the component of the laser radiation reflected and absorbed by the basic material is also the same, with the result that in the final analysis reproducible spot welds 30 of the same quality are produced. It is thereby advantageously avoided that the laser beams 39 must be readjusted for each individual spot weld 30 in order to keep constant the absorbed component of the laser radiation which effects the welding. Consequently, the method of fabrication can also proceed in a largely automated fashion.

It can further be achieved by the configuration of the method of production that during welding the basic material of the contact body 7 is not melted away without entering into a connection with the contact carrier 8, 9, and that no groove can arise in the weld zone. The method of production permits, in particular, that, in accordance with FIG. 15, the laser beam 39 for the spot weld 30 can be directed essentially perpendicular to the surface 43 of the second side 23 of the contact carrier 8, 9 onto the embossed region 27 without there being the risk that the projecting remainder 29 or some other undesired part of the contact body 7 will also be included during welding, resulting in the withdrawal of energy from the actual welding. It is thereby ensured that the weld zone of the spot weld 30 uniformly includes the border region between the contact carrier 8, 9, the embossed region 27 and, if appropriate, the part 46 of the contact body 7, and this contributes to the achievement of reproducible, uniform welding. Although the perpendicular alignment is preferred for above reasons, the laser beam 39 can also, should this be desirable for tooling or other reasons, be aligned inclined at an angle to the surface 43 of the second side 23 of the contact carrier 8, 9.

Figure 12:
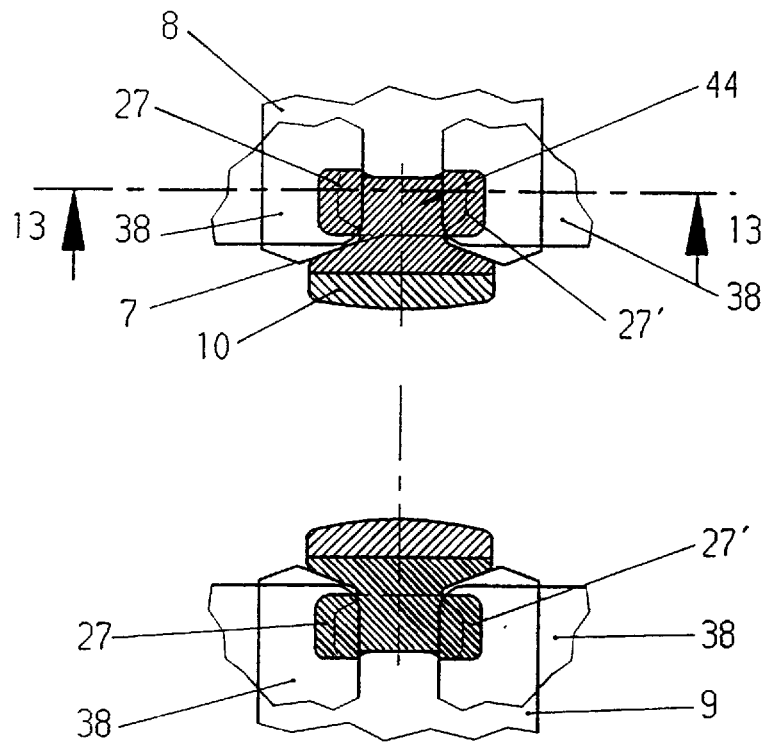
FIG. 12 shows a segment of the invention as in FIG. 6 after the embossing of the region to be embossed on the contact body.
Figure 13:
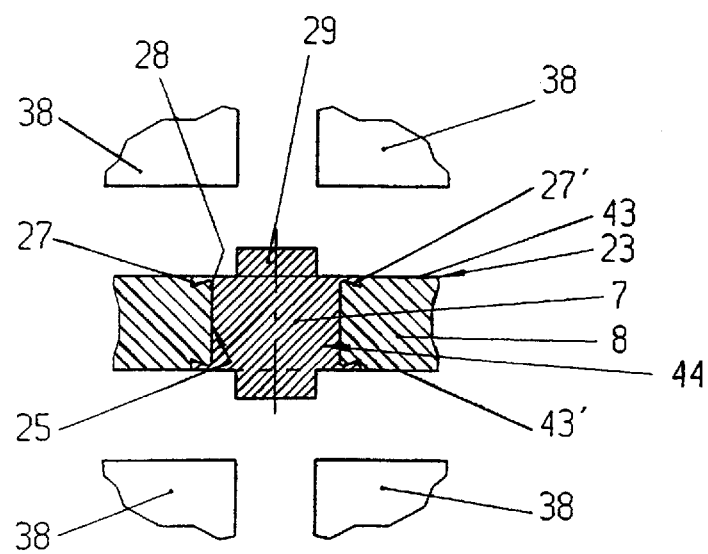
FIG. 13 shows a section along the line 13—13 from FIG. 12.
Figure 14:
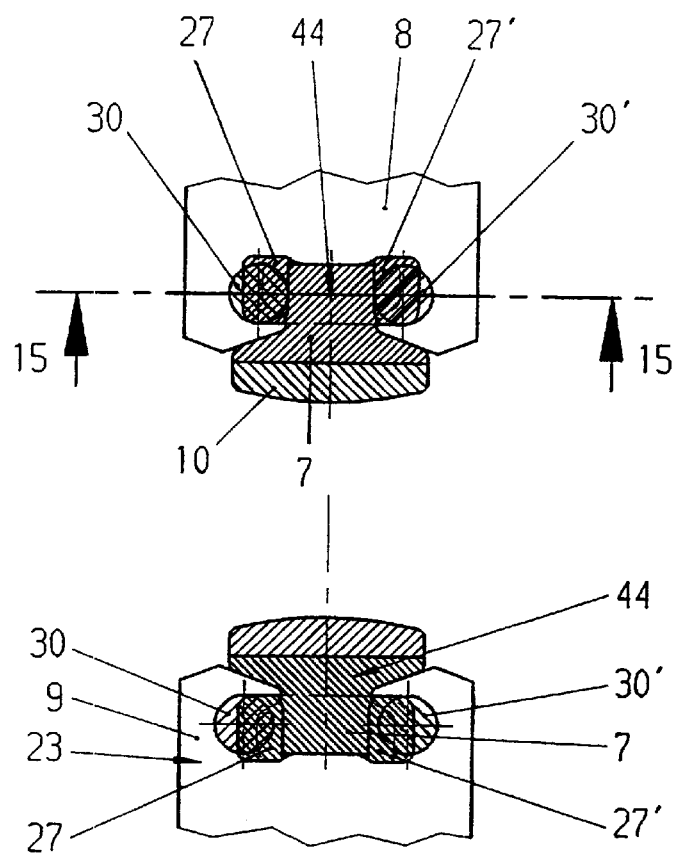
FIG. 14 shows a segment of the invention as in FIG. 6 during welding.
Figure 15:
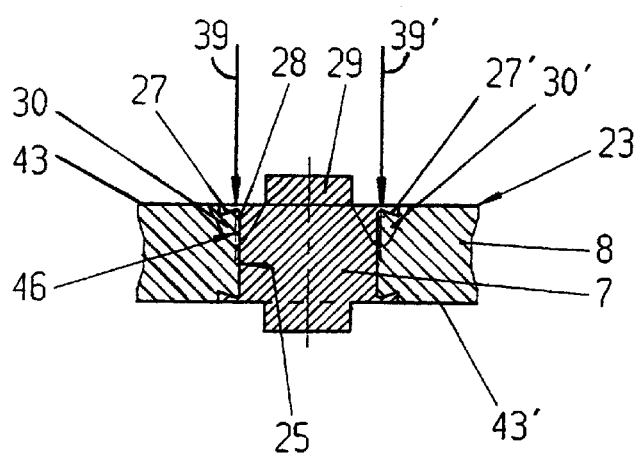
FIG. 15 shows a section along the line 15—15 from FIG. 14.

The production steps described can also be appropriately expanded if, in accordance with FIGS. 14 and 15, a plurality of spot welds 30, 30' per fixed contact 5, 6 are arranged. As already mentioned, the contact body 7 can be embossed and welded at two, preferably mutually opposite regions 27, 27' with the second side 23 of the contact carrier 8, 9, the respective region 27, 27' being arranged, in particular, on that part of the contact body 7 which adjoins the exposed contact surface 10. As is shown in FIGS. 12 and 13, it is preferred for the embossing tool 38 to be configured such that embossing is undertaken simultaneously in each case on the two regions 27, 27', specifically in each case on the two surfaces 43, 43' of the second side 23. It is likewise possible for the embossing to be undertaken simultaneously on the regions 27, 27', by splitting the laser beam into the corresponding number of individual component beams 39, 39', as emerges from FIG. 15. As a rule, it suffices to weld the embossed regions 27, 27' on one surface 43 of the second side 23. If desired, however, it is also additionally possible to undertake welding on the further surface 43'.

In a further embodiment of the invention, it is possible in accordance with FIG. 6, as already mentioned, for at least one free space 37, 37' for receiving embossed material of the contact body 7 to be located in the recess 25, on the side opposite the free contact surface 10, between the contact body 7 and the contact carrier 8, 9. The embossing is expediently performed in such a way that with reference to the surface 43, 43' of the second side 23 of the contact carrier 8, 9, the entire embossed region 27, 27' of the contact body 7 forms an essentially parallel, planar surface, as is also to be seen in FIG. 13, with the result that the scattering losses of the laser beam 39 are minimized. It is particularly preferred in this case that this surface runs evenly relative to the second side 23 of the contact carrier 8, 9 and covers the joint zone which is included in the weld zone of the spot weld 30 and is formed by the part which is to of the border region between the contact carrier 8, 9, the embossed region 27, 27' and, if appropriate, the part 46. For the purpose of producing this planar surface, the embossing tool 38 is configured in such a way that the entire embossed region 27, 27' of the contact body 7 is planished during embossing to one level with reference to the surface 43, 43' of the second side 23. The embossing or planishing also serves to support the clamping of the contact piece 44 in the recess 25 until the welding. Thus, the embossing or planishing prevents tensile stresses which can lead to twisting of the contact piece 44 in the recess 25. Furthermore, gaps due to fabrication can occur because of tolerances between the contact piece 44 and the recess 25. The embossing or planishing reliably disposes of the risk of molten metal falling through in such gaps during welding because of capillary forces.

In a further refinement, additional steps of the method of production can also be provided between the introduction of the contact piece 44 into the recess 25 and the embossing of the region 27, 27' with the contact carrier 8, 9. As is to be seen in FIGS. 8 and 9, a bead 31, 31' can be introduced in the contact carrier 8, 9 on the second side 23, at least along a subregion of the contact body 7. The region 27, 27' to be embossed is then embossed on the projecting contact body 7 into this bead 31, 31'. The embossed material of the contact body 7 is received by the bead 31, 31', it being possible during embossing for the material embossed into the bead 31, 31' to be planished approximately level with the surface 43, 43' of the second side 23 of the contact carrier 8, 9, as already explained with the aid of FIGS. 12 and 13. It is preferably the case that the weld zone of the spot weld 30, 30' then includes the embossed region 27, 27' in the bead 31, 31'. The bead 31, 31' is produced after the insertion of the contact piece 44 into the recess 25 by using an appropriately configured tool 40 to emboss the bead 31, 31' at least around a subregion of the contact body 7 into the contact carrier 8, 9 on the second side 23. The effect of the bead 31, 31' is, inter alia, that the bearing pressure on the contact body 7 is increased, and this in turn contributes to improving the clamping of the contact piece 44 in the recess 25.

Figure 10:
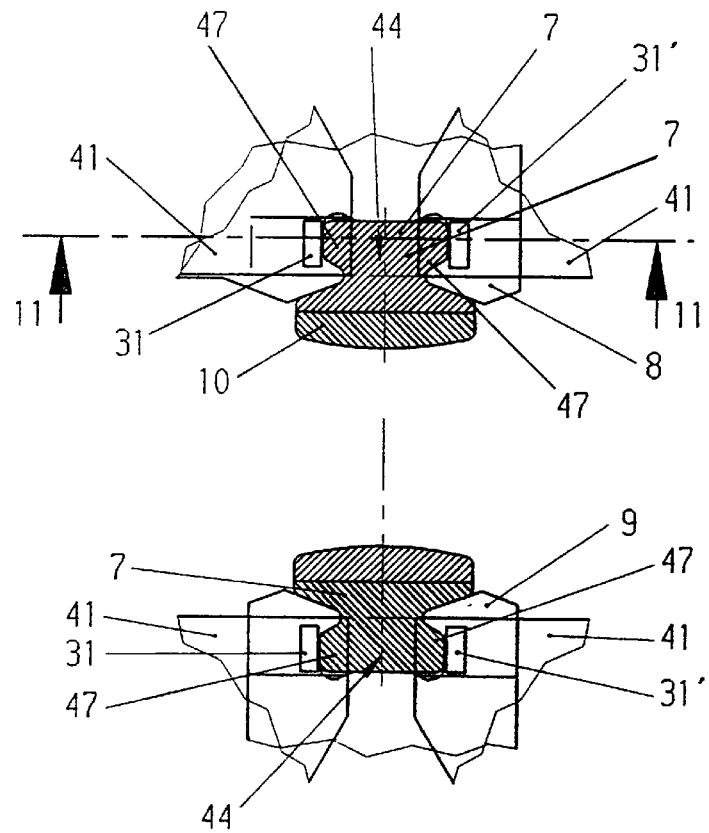
FIG. 10 shows yet another embodiment of the invention, in particular a segment as in FIG. 6 after the peeling back of the region to be embossed on the contact body.
Figure 11:
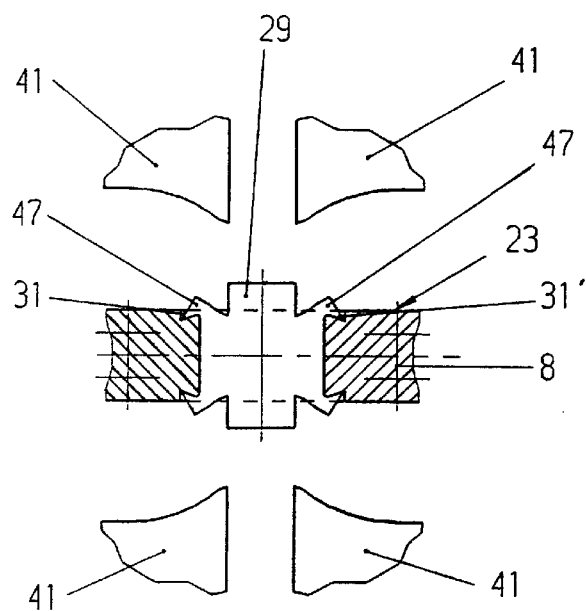
FIG. 11 shows a section along the line 11—11 from FIG. 10.

If appropriate, after the introduction of the bead 31, 31' on the projecting contact body 7 a peeling tool 41 can be used to peel back the region 27, 27' of the contact body 7 to be embossed, as is shown in FIGS. 10 and 11, in order to facilitate the subsequent embossing. The peeled-back material 47 of the contact body 7 can already be shaped by the peeling tool 41 in the direction of the bead 31, 31'. Subsequently, the already described embossing and planishing is then carried out by means of the embossing tool 38, with the result that this material 47 is approximately level with the surface 43, 43' of the second side 23 of the contact carrier 8, 9, and the welding is also carried out by focusing the laser beam 39, 39' onto the embossed region 27, 27' on the bead 31, 31'.

The invention is not limited to the exemplary embodiments described and represented. Rather, it also includes all developments of a person skilled in the art within the scope of the concept of the invention. Thus, the method according to the invention can be used not only to produce fixed contacts, but also to produce other contacts of a contact system, for example for the switching contact, as well.

What is claimed is:

1. An electric switch having a contact system with a contact including a contact body and a contact surface, the contact system being arranged in a recess on a contact carrier in such a way that the contact surface is exposed on the contact carrier, and the contact body projects on one side of the contact carrier, the contact body being fastened on the contact carrier, wherein a region along an edge of the recess, of the projecting contact body (7) is embossed with the side of the contact carrier, and at least one spot weld, produced by means of a laser beam and forming a resultant weld zone, is arranged at least partially on the embossed region of the contact body in such a way that the resultant weld zone of the at least one spot weld includes at least partially a region bordering the contact carrier and the embossed region.

2. The electric switch according to claim 1, wherein the embossed region of the contact body forms an essentially parallel planar surface with a surface of the side of the contact carrier.

3. The electric switch according to claim 2, wherein the embossed region of the contact body runs evenly with a surface of the side of the contact carrier.

4. The electric according to claim 2, wherein the embossed region covers a joint zone included in the resultant weld zone of the at least one spot weld.

5. The electric switch according to claim 1, further comprising a bead in the contact carrier located at least along a subregion of the contact body and wherein the embossed region of the contact body is embossed into the bead, and the resultant weld zone of the at least one spot weld includes the embossed region in the bead.

6. The electric switch according to claim 5, wherein the material of the contact body embossed into the bead is approximately level with a surface of the side of the contact carrier.

7. The electric switch according to claims 1, wherein the contact body is embossed and welded at two mutually opposite areas of the region to be embossed, the respective areas being located, on a part of the contact body which adjoins an exposed surface of the contact surface, and a free space for receiving material of the contact body displaced during embossing is located in the recess, between the contact body and the contact carrier.

8. The electric switch according to claim 1, wherein the resultant weld zone includes a part of the contact body which is located in the recess along an edge of the recess.

9. A method for producing an electric switch having a contact system including a contact piece with a contact body and a contact surface inserted into a recess on a contact carrier of the contact system in such a way that the contact surface is exposed on the contact carrier and the contact body projects on one side of the contact carrier said method comprising the steps of:

embossing a region along an edge of the recess with the side of the contact carrier, and focussing a laser beam, a in direction toward the side of the contact carrier, beam at least partially on the embossed region of the contact body (7) in such a way to produce a weld zone of a resultant spot weld that includes at least partially a region bordering the contact carrier and the embossed region.

10. The method according to claim 9, further comprising the step of planishing the embossed region of the contact body during the embossing step to a level such that the embossed region forms an essentially planar surface which is parallel to the side of the contact carrier, and wherein the planished surface of the embossed region covers a joint zone included by the weld zone of the spot weld.

11. The method according to claim 10, wherein the embossed region runs evenly with a surface of the side of the contact carrier.

12. The method according to claim 9, further comprising the step of: after insertion of the contact piece into the recess on the contact carrier, embossing a bead into the contact carrier at least along a subregion of the contact body, and wherein the bearing pressure on the contact body in the recess is increased, the embossed region of the contact body is embossed into the bead and the laser beam is focused on the embossed region in the bead.

13. The method according to claim 12, further comprising the step of:

subsequent to the embossing of the projecting contact body, peeling back the embossed region such that material of the contact body is embossed into the bead.

14. The method according to claim 12, further comprising the step of:

planishing the embossed region so that the embossed region is approximately level with a surface of the side of the contact carrier.

15. The method according to claim 9, wherein the contact body is embossed and welded at two, mutually opposite areas of the region to be embossed with the side of the contact carrier, the respective areas being located on a part of the contact body which adjoins an exposed surface of the contact surface, the embossing step and, subsequently, the focussing step and resultant welding are respectively undertaken simultaneously on both areas, and wherein a free space for receiving material of the contact body displaced during the embossing step is introduced in the recess between the contact body and the contact carrier.

16. The method according claim 9, wherein the laser beam, for the spot weld is directed essentially perpendicular to a surface of the side of the contact carrier onto the embossed region.

17. The method according to claim 16, wherein the at least one spot weld is produced by a pulsed laser beam.

18. The method according to claim 9, wherein the focusing step produces a resultant spot weld that includes a part of the contact body which is located in the recess along the edge of the recess.

* * * * *